(12) United States Patent
Schroeder et al.

(10) Patent No.: US 8,336,736 B2
(45) Date of Patent: Dec. 25, 2012

(54) FLOW CONTROL AND MANIFOLD ASSEMBLY

(75) Inventors: A. A. Jud Schroeder, San Antonio, TX (US); Dave Santy, Converse, TX (US); Deborah Absalon, Converse, TX (US)

(73) Assignee: Schroeder Industries, Inc., San Antonio, TX (US)

( * ) Notice: Subject to any disclaimer, the term of this patent is extended or adjusted under 35 U.S.C. 154(b) by 802 days.

(21) Appl. No.: 12/465,283

(22) Filed: May 13, 2009

(65) Prior Publication Data

US 2009/0283543 A1 Nov. 19, 2009

Related U.S. Application Data

(60) Provisional application No. 61/127,769, filed on May 15, 2008, provisional application No. 61/205,749, filed on Jan. 22, 2009.

(51) Int. Cl.
*B67D 7/06* (2010.01)
(52) U.S. Cl. ..................................... 222/144.5; 137/884
(58) Field of Classification Search ............... 222/144.5, 222/145.1–145.6, 630, 129.1–129.4; 137/884, 137/605–607; 251/304
See application file for complete search history.

(56) References Cited

U.S. PATENT DOCUMENTS

| | | | |
|---|---|---|---|
| 1,627,147 A | 5/1927 | Clark | |
| 1,947,329 A | 2/1934 | Buttner | |
| 2,478,586 A | 8/1949 | Krapp | |
| 2,682,386 A | 6/1954 | Lindsay | |
| 2,887,250 A | 5/1959 | Zilk | |
| 2,937,792 A | 5/1960 | Firstenberg | |
| 3,009,653 A | 11/1961 | Hedeman | |

(Continued)

FOREIGN PATENT DOCUMENTS

GB 1 300 072 12/1972

OTHER PUBLICATIONS

Wunder-Bar Food & Beverage dispensing Systems, Post-Mix Beverage dispenser, Automatic Bar Controls, Inc., Rev. 120508.

*Primary Examiner* — Lien Ngo
(74) *Attorney, Agent, or Firm* — Jackson Walker, LLP

(57) ABSTRACT

A device for controlled delivery of pressurized fluids from a multiplicity of pressurize fluid sources having a multiplicity of pressurized fluid lines engaged therewith to a bar gun. The device comprises a flow control assembly with a multiplicity of flow channel assemblies. Each flow channel assembly has a high pressure tube receiving port adapted to receive a fluid pressure line from a high pressure fluid source. Each flow control assembly has an on/off valve and flow control structure downstream thereof. The flow control structure may be self-adjusting or mechanical control. The flow control assembly includes a housing for engaging the fluid flow channel assemblies thereon. A manifold assembly is adapted to engage the flow control assembly. The manifold assembly includes a multiplicity of connector fittings, each having an upstream and a downstream end. The upstream end is adapted to slideably receive the outlet ports of the fluid flow channel assemblies and the downstream end is designed to engage a fluid line. A multiplicity of fluid lines engage a sheath tube assembly which usually includes a sheath tube which, at a removed end, is adapted to engage a bar gun. The flow control assembly and manifold assembly include a release member for releasably engaging the tube.

27 Claims, 11 Drawing Sheets

U.S. PATENT DOCUMENTS

| | | | |
|---|---|---|---|
| 3,013,701 A | 12/1961 | Joschko | |
| 3,108,779 A | 10/1963 | Anderson | |
| 3,326,520 A | 6/1967 | Guenther | |
| 3,619,668 A | 11/1971 | Pinckaers | |
| 3,643,754 A | 2/1972 | Brandin et al. | |
| 3,867,962 A | 2/1975 | Gerrard | |
| 3,963,317 A | 6/1976 | Eigenbrode et al. | |
| 4,098,295 A | 7/1978 | Haytayan | |
| 4,196,886 A | 4/1980 | Murray | |
| 4,219,046 A | 8/1980 | West et al. | |
| 4,390,224 A | 6/1983 | Showman et al. | |
| 4,433,795 A | 2/1984 | Maiefski et al. | |
| 4,469,389 A | 9/1984 | Grabbe et al. | |
| 4,497,421 A | 2/1985 | Schilling | |
| 4,519,635 A | 5/1985 | McMath | |
| 4,619,378 A | 10/1986 | de Man | |
| 4,635,824 A | 1/1987 | Gaunt et al. | |
| 4,637,527 A | 1/1987 | Arrigoni | |
| 4,711,374 A | 12/1987 | Gaunt et al. | |
| 4,781,309 A | 11/1988 | Vogel | |
| 4,821,921 A | 4/1989 | Cartwright et al. | |
| 4,921,140 A | 5/1990 | Belcham | |
| D309,232 S | 7/1990 | Valiyee et al. | |
| 4,986,449 A | 1/1991 | Valiyee et al. | |
| 5,033,648 A | 7/1991 | Nakayama et al. | |
| 5,042,692 A | 8/1991 | Valiyee et al. | |
| 5,524,452 A | 6/1996 | Hassell et al. | |
| 5,575,405 A | 11/1996 | Stratton et al. | |
| 5,649,431 A | 7/1997 | Schroeder, Jr. | |
| 5,873,259 A | 2/1999 | Spillman | |
| 6,112,946 A | 9/2000 | Bennett et al. | |
| 6,196,422 B1 | 3/2001 | Tuyls et al. | |
| 6,260,477 B1 | 7/2001 | Tuyls et al. | |
| 6,269,973 B1 | 8/2001 | Bennett et al. | |
| 6,322,051 B1 | 11/2001 | Salmela | |
| 6,328,181 B1 | 12/2001 | Schroeder et al. | |
| 6,405,897 B1 | 6/2002 | Jepson et al. | |
| 6,672,849 B1 | 1/2004 | Martindale et al. | |
| 6,722,527 B1 | 4/2004 | Krauss | |
| 6,832,487 B1 | 12/2004 | Baker | |
| 7,025,230 B1 | 4/2006 | Salmela | |
| 7,028,864 B2 | 4/2006 | McCann | |
| 7,080,937 B1 | 7/2006 | Salmela et al. | |
| 7,232,044 B1 | 6/2007 | Salmela | |
| D549,021 S | 8/2007 | Tuyls et al. | |
| 7,384,073 B1 | 6/2008 | Tuyls et al. | |
| 7,448,418 B1 | 11/2008 | Tuyls | |
| 7,762,431 B1 | 7/2010 | Tuyls et al. | |
| D626,373 S | 11/2010 | Valiyee et al. | |
| D626,374 S | 11/2010 | Valiyee et al. | |
| D626,375 S | 11/2010 | Valiyee et al. | |
| D628,014 S | 11/2010 | Martindale | |
| 7,931,382 B2 | 4/2011 | Hecht | |
| D638,659 S | 5/2011 | Martindale et al. | |
| D643,708 S | 8/2011 | Hecht | |
| D647,785 S | 11/2011 | Hecht | |
| D648,420 S | 11/2011 | Hecht | |
| D648,421 S | 11/2011 | Hecht | |
| D648,617 S | 11/2011 | Hecht | |
| D648,826 S | 11/2011 | Hecht | |
| 2008/0135426 A1 | 6/2008 | Hecht et al. | |
| 2008/0217357 A1 | 9/2008 | Hecht | |
| 2009/0078722 A1 | 3/2009 | Salmela | |
| 2009/0090747 A1 | 4/2009 | Tuyls et al. | |
| 2009/0145927 A1 | 6/2009 | Salmela et al. | |
| 2009/0230148 A1 | 9/2009 | Valiyee et al. | |
| 2010/0097881 A1 | 4/2010 | Tuyls et al. | |
| 2010/0116842 A1 | 5/2010 | Hecht et al. | |
| 2010/0147886 A1 | 6/2010 | Martindale | |
| 2010/0314411 A1 | 12/2010 | Tuyls et al. | |
| 2011/0057134 A1* | 3/2011 | Martindale et al. | 251/304 |
| 2011/0073617 A1 | 3/2011 | Martindale et al. | |
| 2011/0286883 A1 | 11/2011 | Hecht et al. | |
| 2011/0315711 A1 | 12/2011 | Hecht et al. | |

* cited by examiner

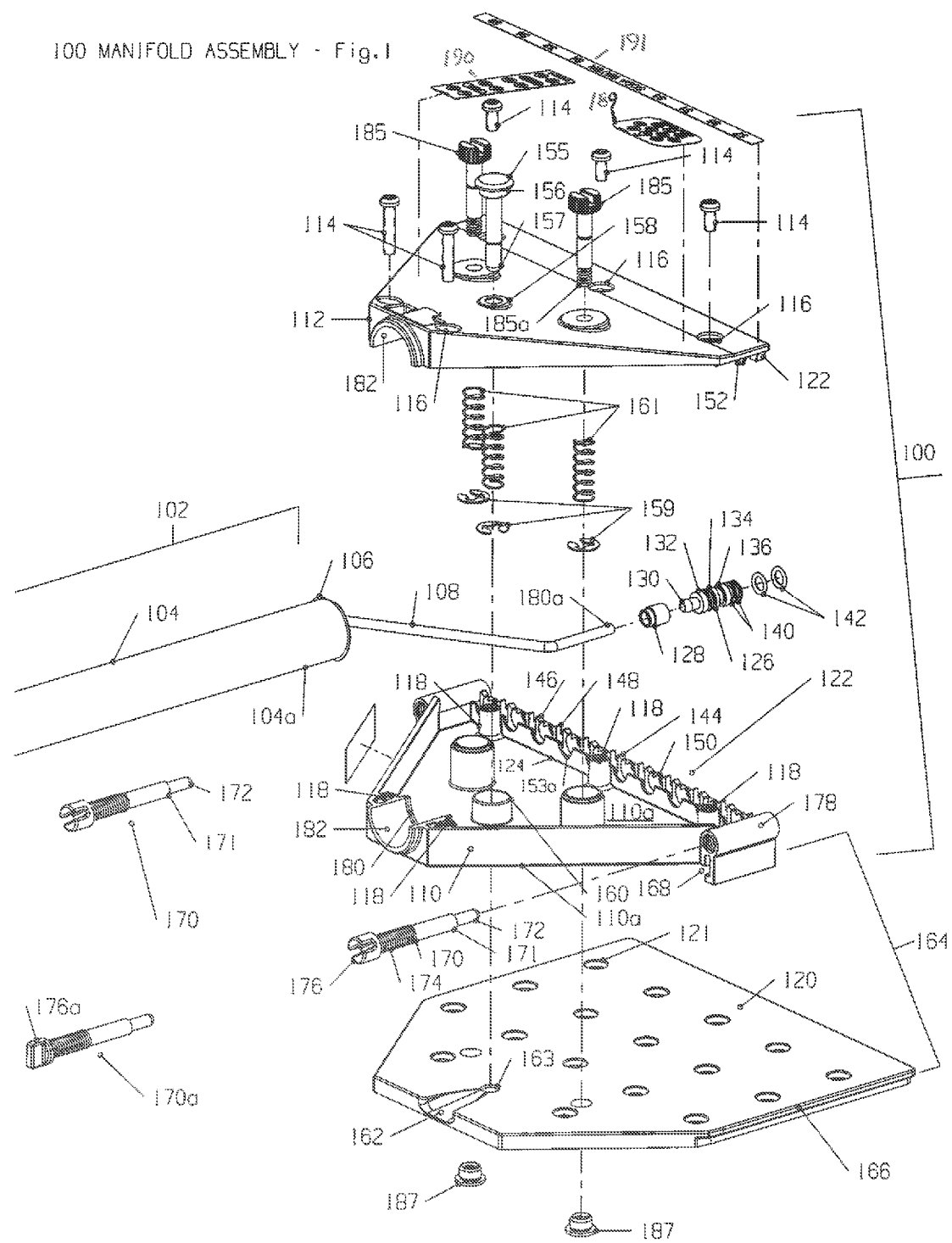

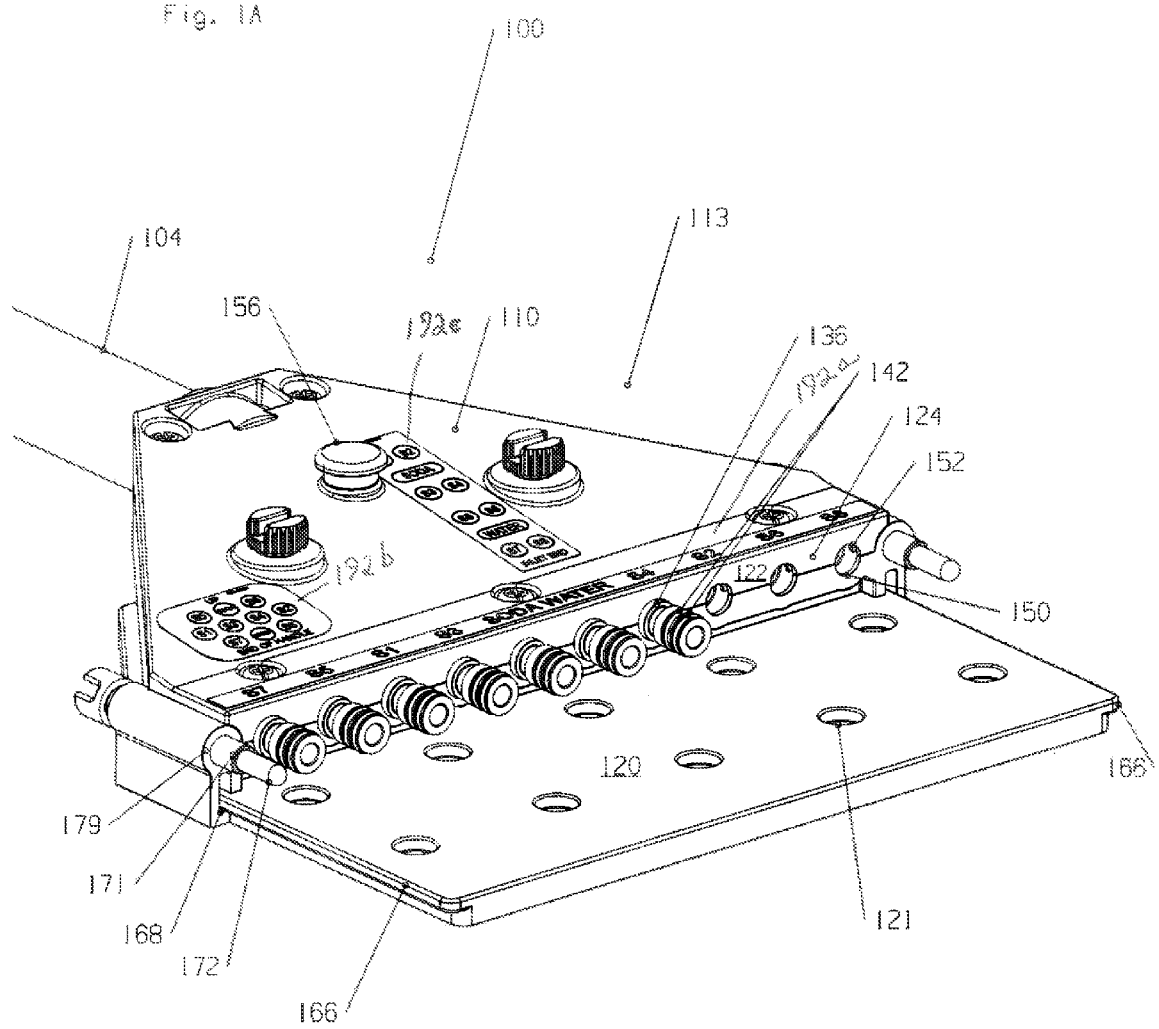

DETAIL D
SCALE 2:1

SECTION C-C

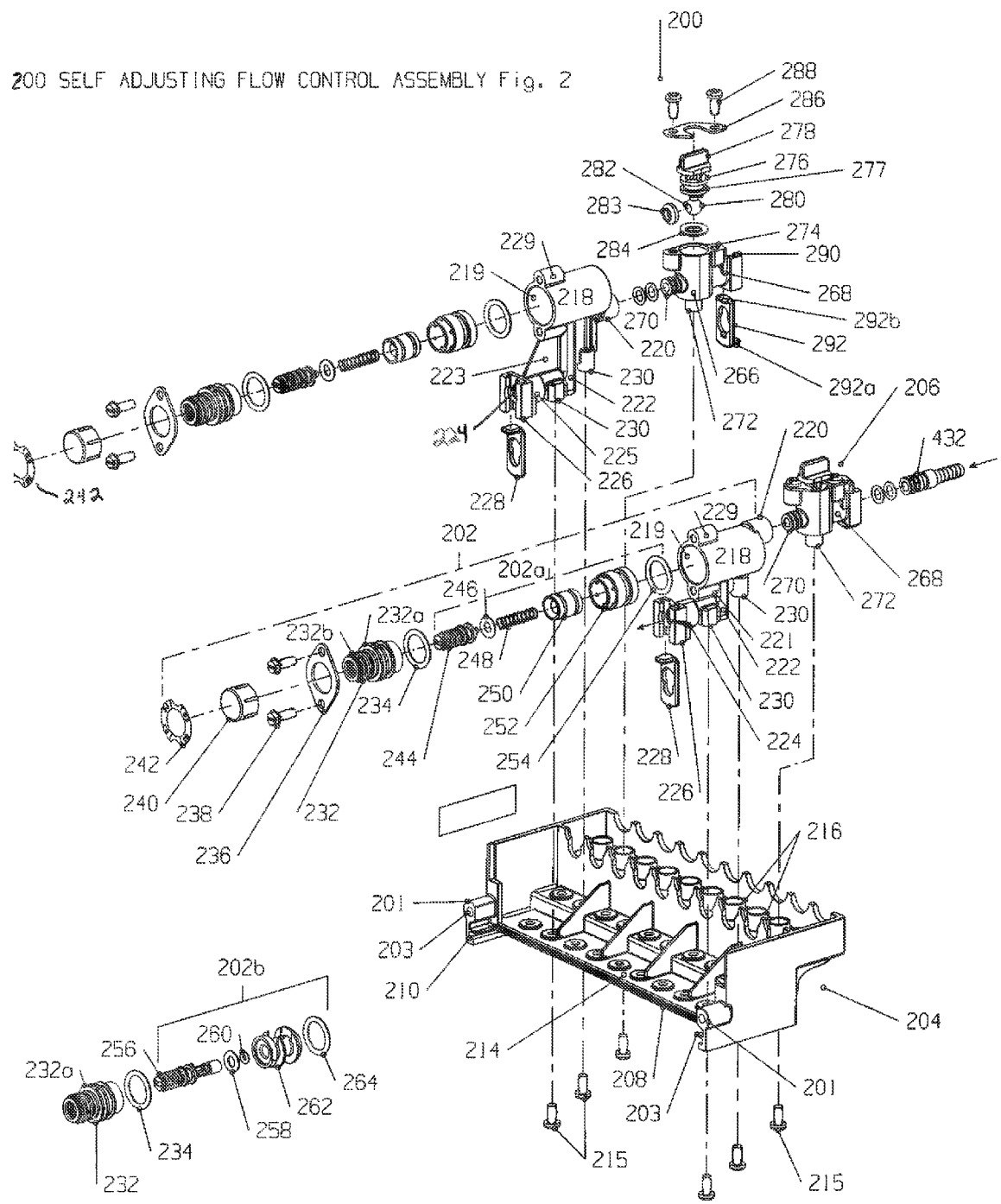

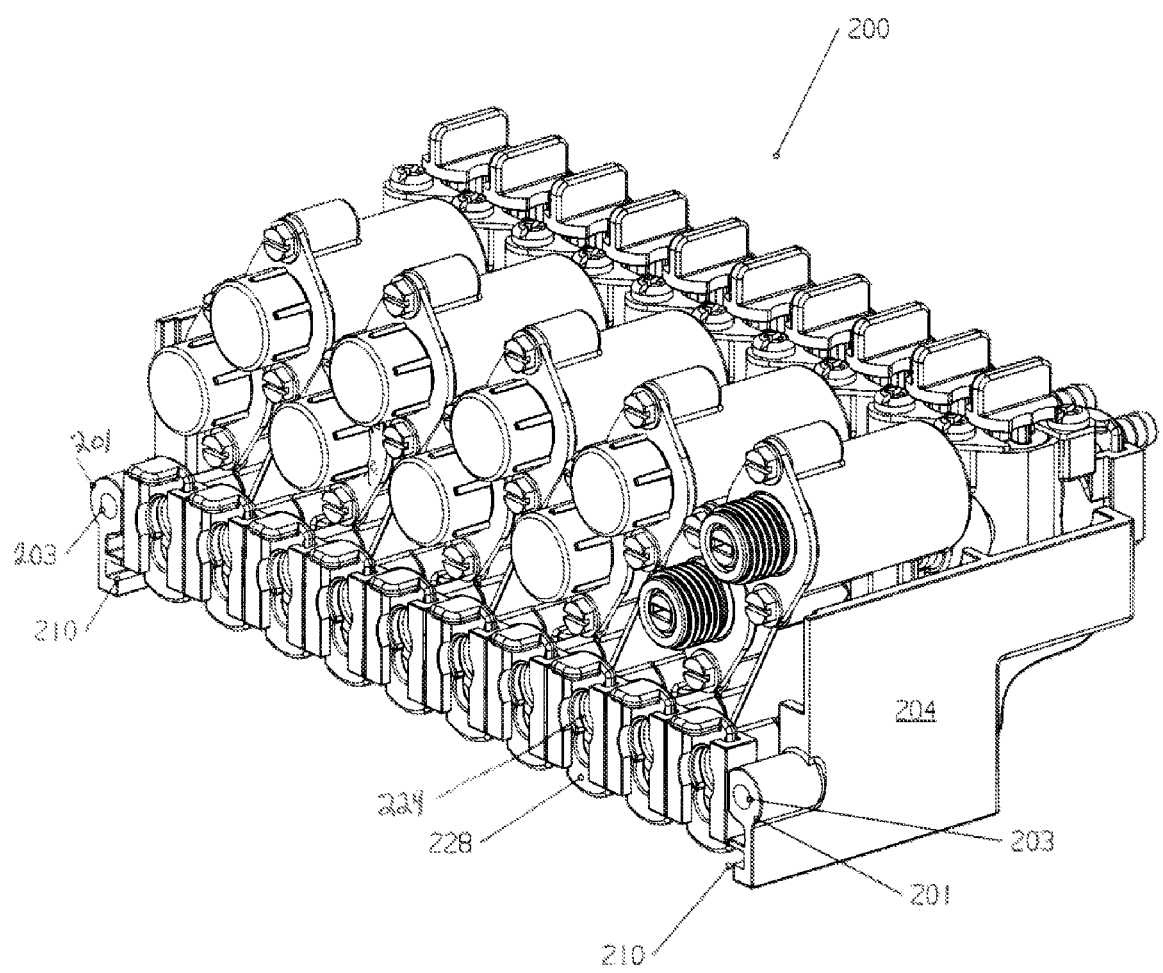

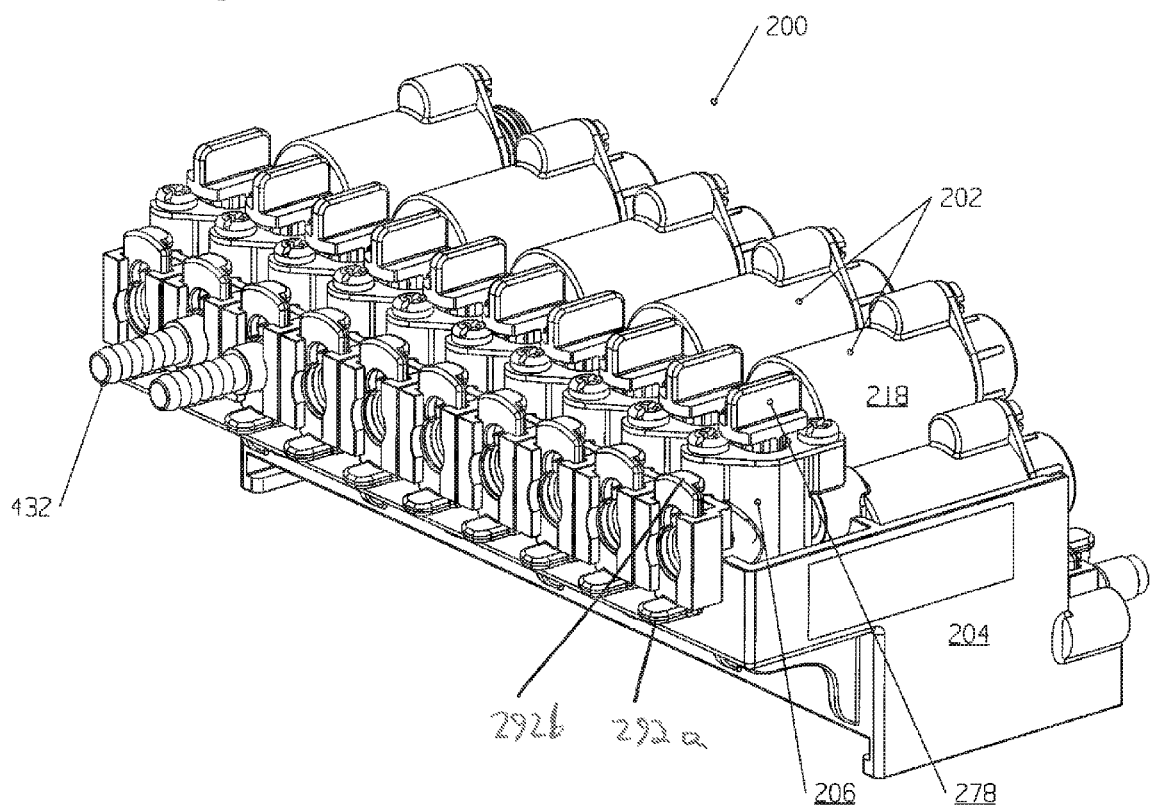
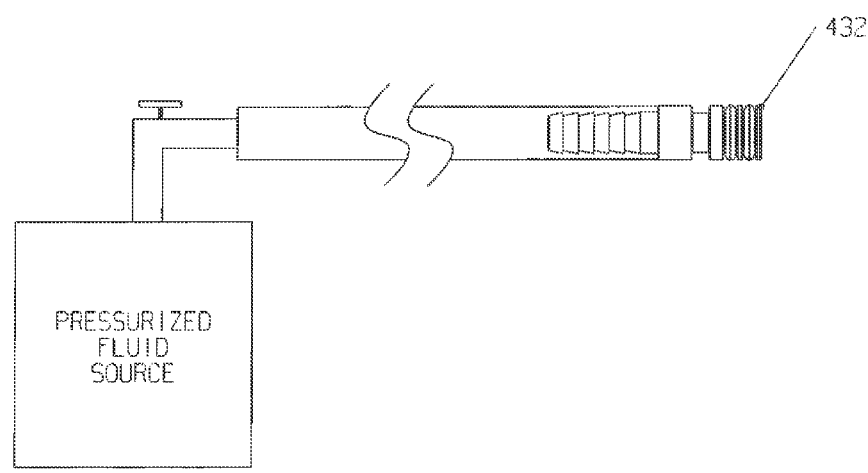

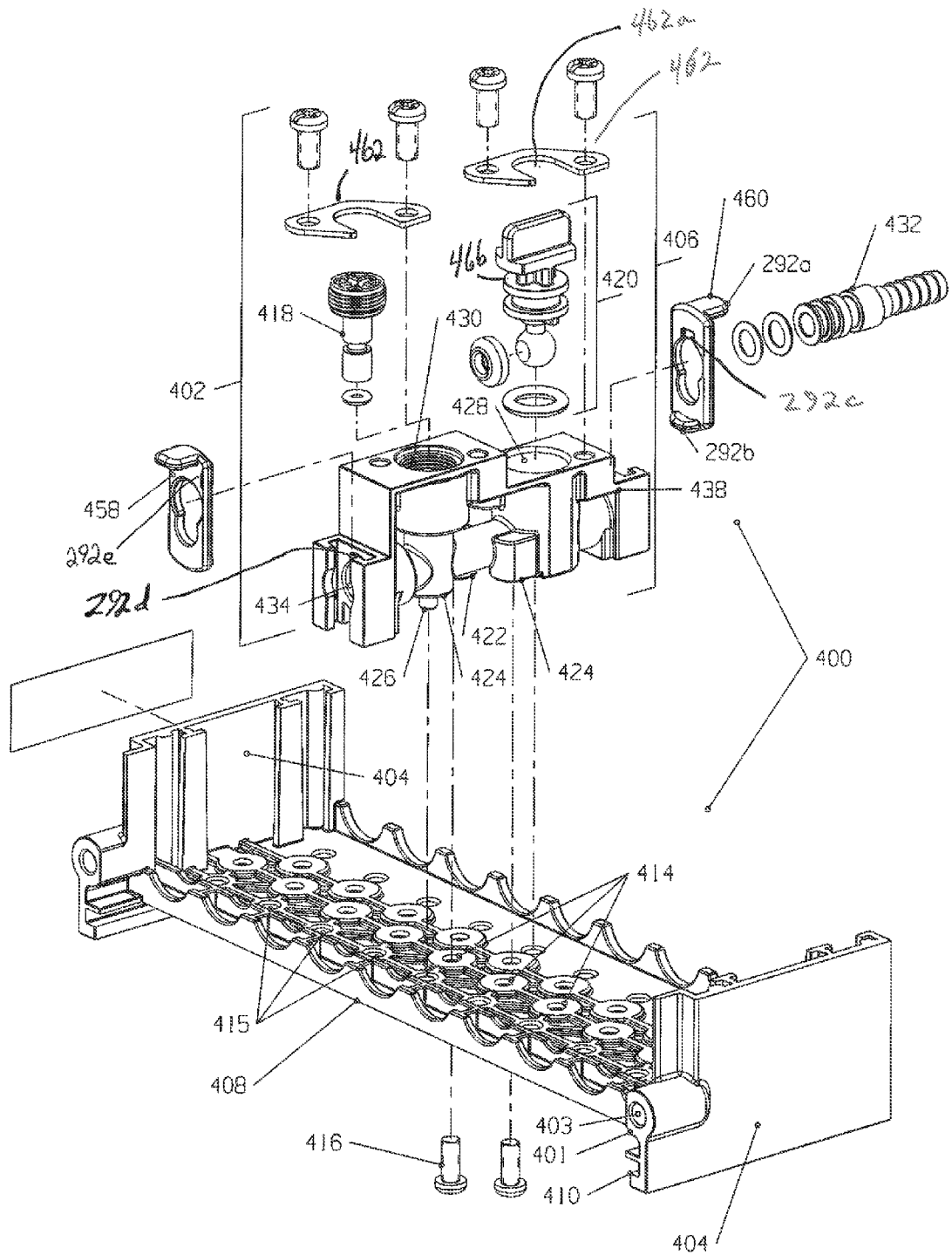

FLOW CONTROL AND MANIFOLD ASSEMBLY

This is a utility application claiming the benefit of, and priority to, and incorporating by reference all of the following: provisional patent application Ser. No. 61/127,769, filed May 15, 2008; provisional patent application Ser. No. 61/205,749, filed Jan. 22, 2009; and patent application Ser. No. 12/315,249, filed Dec. 1, 2008.

FIELD OF THE INVENTION

Flow control and manifold assemblies for use with high pressure fluids, such as multiple pressurized syrup canisters and pressurized soda water, wherein the pressurized fluids are provided to a bar gun for the dispensing of soda water and a pre-elected syrup flavor into a container for dispensing to a patron.

BACKGROUND OF THE INVENTION

Bar guns are typically provided for dispensing a beverage into a container. Sometimes bar guns are provided with the capability to dispense a multiple of different syrups along with soda water. That is to say, a single bar gun may be adapted, in ways familiar to the art, to dispense a number of different flavored drinks.

A bar gun is typically engaged to a flow control and manifold assembly. At an inlet end of a flow control and manifold assembly, a multiplicity of fluid containing lines, carrying pressurized fluid (typically a multiplicity of different syrups along with soda water) are engaged with the flow control and manifold assembly. These various fluids are typically received by the flow control and manifold assembly at a high inlet end pressure. That is, at an upstream or inlet end of a typical flow control and manifold assembly different fluids in a multiplicity of individual lines are received. The rate of flow for each fluid is selectively controlled by elements of the flow control manifold and assembly. The controlled flow is delivered to the individual lines at the outlet end of the assembly.

A function of a flow control and manifold assembly is to receive a multiplicity of fluids from high pressure tanks, to provide flow control mechanisms designed to allow the user to adjust the flow between the inlet of the fluid to the flow control assembly and the outlet from the manifold. Doing so will deliver a controlled fluid flow to the bar gun, which fluid can be dispensed by the user with on/off buttons of the bar gun.

Prior art flow control and manifold assemblies typically include either a self-adjusting flow control assembly or a mechanical flow control assembly. While the fluid flow through may be manually set by a user in both, typically with a screwdriver, a self-adjusting flow control assembly will tend to maintain the user's selected flow control despite a change in pressure upstream of the assembly. A mechanical flow control assembly will typically be manually set from time to time when there is a significant drop or change upstream fluid pressure.

It is the purpose generally of flow control assemblies to provide both a manifold for receipt of a multiplicity of lines from a multiplicity of tanks in an arranged manner, typically linearly, and to provide at an outlet of a manifold a multiplicity of outlets corresponding to the inlets, providing fluid at a controlled flow and whose geometrical arrangement is altered from the typically linear inlet side to a circular arrangement, so that the lines may be inserted into and carried by a flexible sheath.

OBJECTS OF THE INVENTION

It is among the objects of the device and assemblies disclosed herein to provide for the easy mounting of an accessibility to a flow control and manifold assembly.

It is yet another of the several objects of the assemblies disclosed herein to provide interchangeability between a common manifold and either of an adjuster aligned or mechanical flow control assembly, with easy coupling thereto.

It is yet another object among several objects of the assemblies disclosed herein to provide for interchangeability of a self-adjusting or fixed orifice flow control subassembly in an otherwise common adjuster aligned flow control assembly, and for providing easy access to the flow control adjusters.

It is yet another object of the present invention to provide for interchangeability with respect to a manifold assembly of the adjuster aligned flow control assembly with a mechanical flow control assembly, whose adjusters are arranged generally perpendicular to the flow of fluid therethrough.

It is yet another object of the present invention to provide for easy servicing of flow control modules without the necessity of removing from the high pressure fluid lines from a fluid tank.

These and other objects are provided in a manifold assembly which has structure for easy and convenient coupling to any one of several flow control assemblies through the use of commonly dimensioned inlet ports for fluid tight seal between the flow control assemblies and the manifold, as well as alignment/coupling screws for alignment with an easy uncoupling of the manifold assembly from any of the flow control assemblies set forth herein.

Applicants further provide, in pursuit of one or more objectives of the present devices and assemblies disclosed herein, the ability to removably couple the flow control modules from shutoff valve assemblies upstream thereof so as to allow maintenance and servicing of the flow control modules without removing the high pressure lines from the assembly.

SUMMARY OF THE INVENTION

In the various embodiments of Applicants' device set forth herein, the structure and function of the flow control assembly and manifold assembly is adapted to achieve a number of advantages. While typical prior art flow control assemblies include a manifold assembly coupled with a flow control assembly, Applicants provide a single manifold assembly adapted to receive either of an adjuster aligned flow control assembly or a mechanical flow control assembly thereby facilitating interchangeability.

Typically, prior art flow control and manifold assemblies are mounted on the underside of a bar or support surface. Applicants provide a mounting plate for receiving the elements of the flow control assembly slideably and toollessly for ease of removing the assemblies from the mounting surface.

Prior art flow control assemblies provide adjusters, typically an adjuster screw, which are oriented perpendicular to the inlets and outlets of the assembly. So oriented, when a prior art assembly is mounted in a horizontal plane as, for example, to the underside of a support surface, such as a table, the perpendicular orientation of the adjuster screws required one to lay under the table or support surface and look upward vertically for viewing, access to and adjustment of the adjuster screw. Applicants have provided a novel arrangement of flow control assembly modules in which the adjuster screw is set in generally linear alignment with the fluid flow through the flow control assembly.

Typical prior art flow control and manifold assemblies have the flow control assemblies integral with a shutoff valve. Applicants provide for a separate shutoff valve, upstream of a flow control module, which shutoff valve can be toollessly separated from the flow control module for easier, more convenient and less messy servicing.

Further advantages are provided in the various designs set forth herein. Applicants provide a flow control and manifold assembly having a flow control module which can accept either of a mechanical flow subassembly or self-adjusting flow control assembly in a manner in which presents the adjuster screw in a horizontal fashion when mounted to a horizontal mounting plate. Further, when so mounted, the inlet end of the flow control and manifold assembly is typically in a horizontal plane as are the outlets. That is to say, the adjuster screws of either of the self-adjusting flow control module or the mechanical flow control module have a horizontal axis that lays in a horizontal plane when the unit is mounted to a support surface so as to accommodate manual adjustment thereof.

Further advantages are provided in Applicants' flow control assembly in that each line has a separate separable ball lock or other shutoff valve upstream of the flow control module, which separate flow control module is separable from the upstream shutoff valve without disturbing or removing the shutoff valve from the housing. Such a feature facilitates servicing of the elements of the flow control module without removal of the high pressure lines from the flow control assembly. This also avoids de-pressurizing the system upstream of the shutoff valve when work is being done on the flow control module, including maintenance and repair.

Further advantages are provided in a novel method of separating the manifold assembly from the flow control assembly, which novel method maintains alignment of the two sub-units during engagement and disengagement.

Applicants' further advantages include those of a multiplicity of slideable retainer slots for engaging the fittings of a manifold into the flow control assembly with retainer clips that are locked in a slot so that they stay with the unit and are not lost or misplaced.

Applicants' novel flow control and manifold assembly includes a means to align the flow control assembly with the manifold assembly during engagement and disengagement.

Applicants' novel flow control and manifold assembly includes means to engage and disengage the manifold from either of the flow control assemblies disclosed herein, which means for assembly, connection and disassembly includes designs adapted to achieve such results without the use of tools. More specifically, a means to align and separate that are easily grasped and rotated by the hand, a means to couple connectors to the manifold assemblies that are easily urged with a hand, a shutoff valve that is easily rotated by hand, and a slideably engaged mounting plate.

It is among the objects of the device and assemblies disclosed herein to provide for the easy mounting of an accessibility to a flow control and manifold assembly.

It is yet another of the several objects of the assemblies disclosed herein to provide interchangeability between a common manifold and either of an adjuster aligned or mechanical flow control assembly, with easy coupling thereto.

It is yet another object among several objects of the assemblies disclosed herein to provide for interchangeability of a self-adjusting or mechanical flow control subassembly in an otherwise common adjuster aligned flow control assembly, and for providing easy access to the flow control adjusters.

It is yet another object of the present invention to provide for interchangeability of the adjuster aligned flow control assembly with a mechanical flow control assembly, whose adjusters are arranged generally perpendicular to the flow of fluid therethrough.

It is yet another object of the present invention to provide for easy servicing of flow control modules without the necessity of removing high pressure fluid lines from a fluid tank.

These and other objects are provided in a manifold assembly which has structure for easy and convenient coupling to anyone of several flow control assemblies through the use of commonly dimensioned inlet ports for fluid tight seal between the flow control assemblies and the manifold, as well as alignment screws for alignment with an easy uncoupling of the manifold assembly from any of the flow control assemblies set forth herein.

Applicants further provide, in pursuit of one or more objectives of the present devices and assemblies disclosed herein, the ability to removably couple the flow control modules from shutoff valve assemblies upstream thereof so as to allow maintenance and servicing of the flow control modules without removing the high pressure lines from the assembly.

BRIEF DESCRIPTION OF THE DRAWINGS

FIG. 1 is an exploded perspective view of the manifold assembly and also illustrates the mounting plate.

FIG. 1A is a perspective view of the manifold assembly and how it engages the mounting plate.

FIG. 2 is an exploded perspective view of the adjuster aligned flow control assembly which is constructed and arranged to engage both the mounting plate and the manifold assembly.

FIG. 2A is a perspective view of the adjuster aligned flow control assembly.

FIG. 2E is a view of Applicant's adjuster aligned flow control assembly and how it engages a generic pressurized fluid source.

FIG. 3 is an exploded perspective view of the mechanical flow control assembly for engagement with the manifold and mounting plate.

DETAILED DESCRIPTION OF THE PREFERRED EMBODIMENT

Figure 1B:
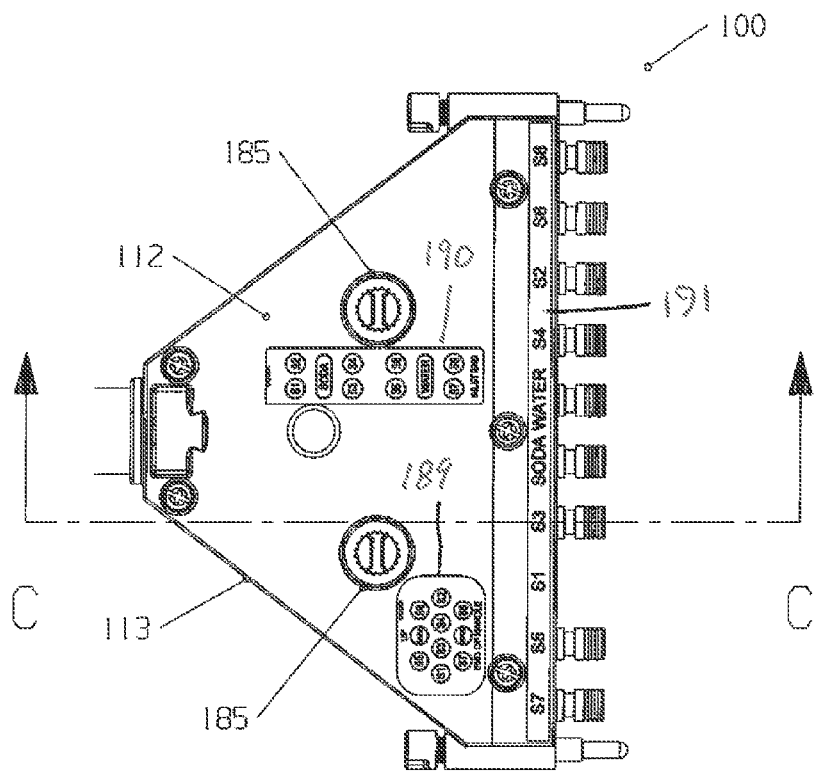
FIG. 1B is a top elevational view of the manifold assembly.
Figure 1D:
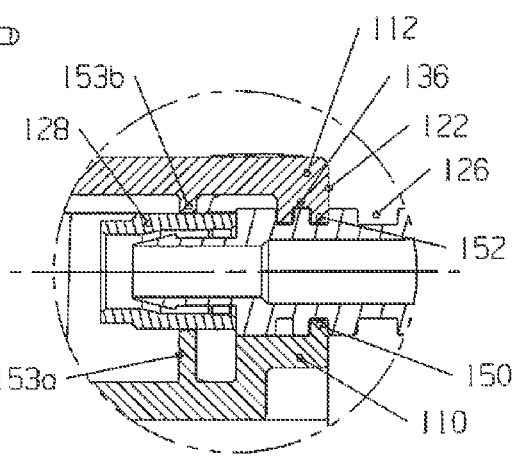
FIG. 1D is a detailed cross-sectional view of the connector fitting and housing.
Figure 1C:
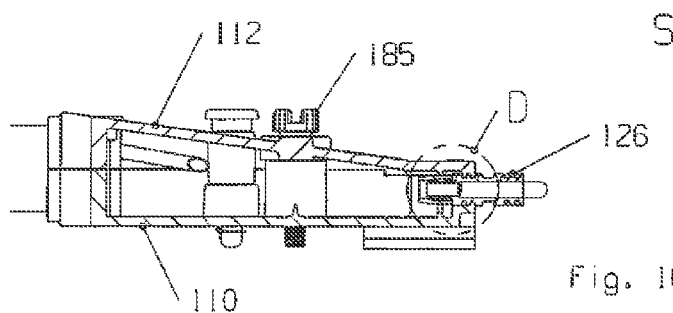
FIG. 1C is a cross-sectional view of the manifold assembly.
Figure 1E:
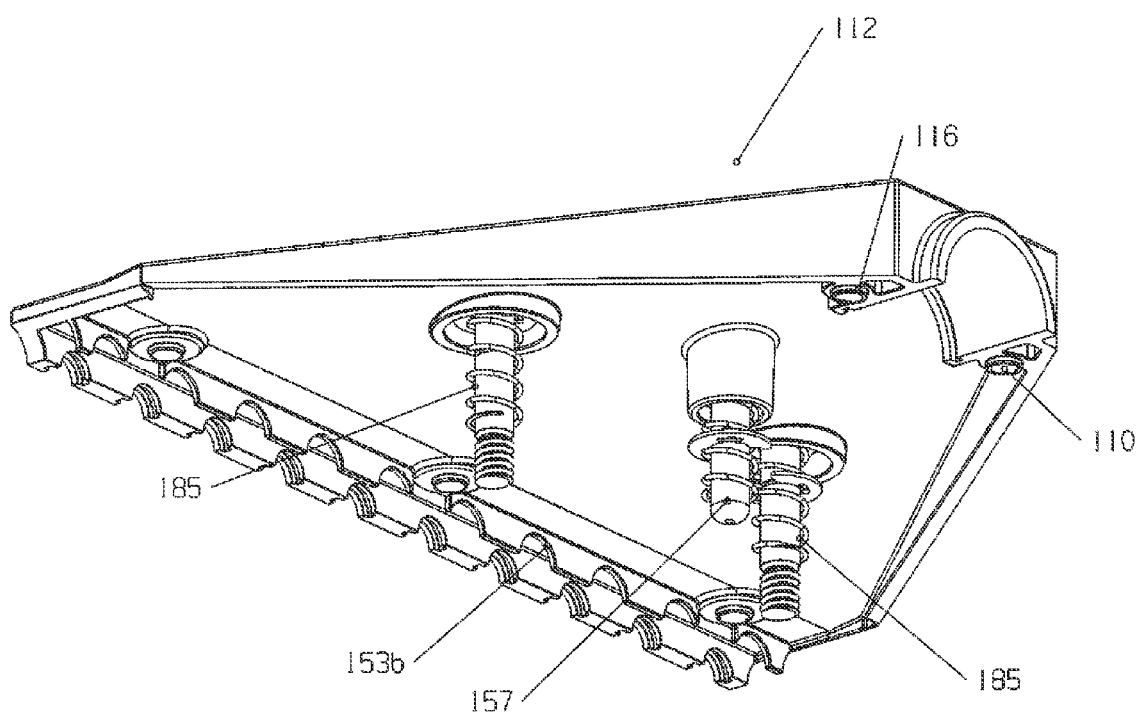
FIG. 1E is a perspective view of the underside of first housing plate.
Figure 1F:
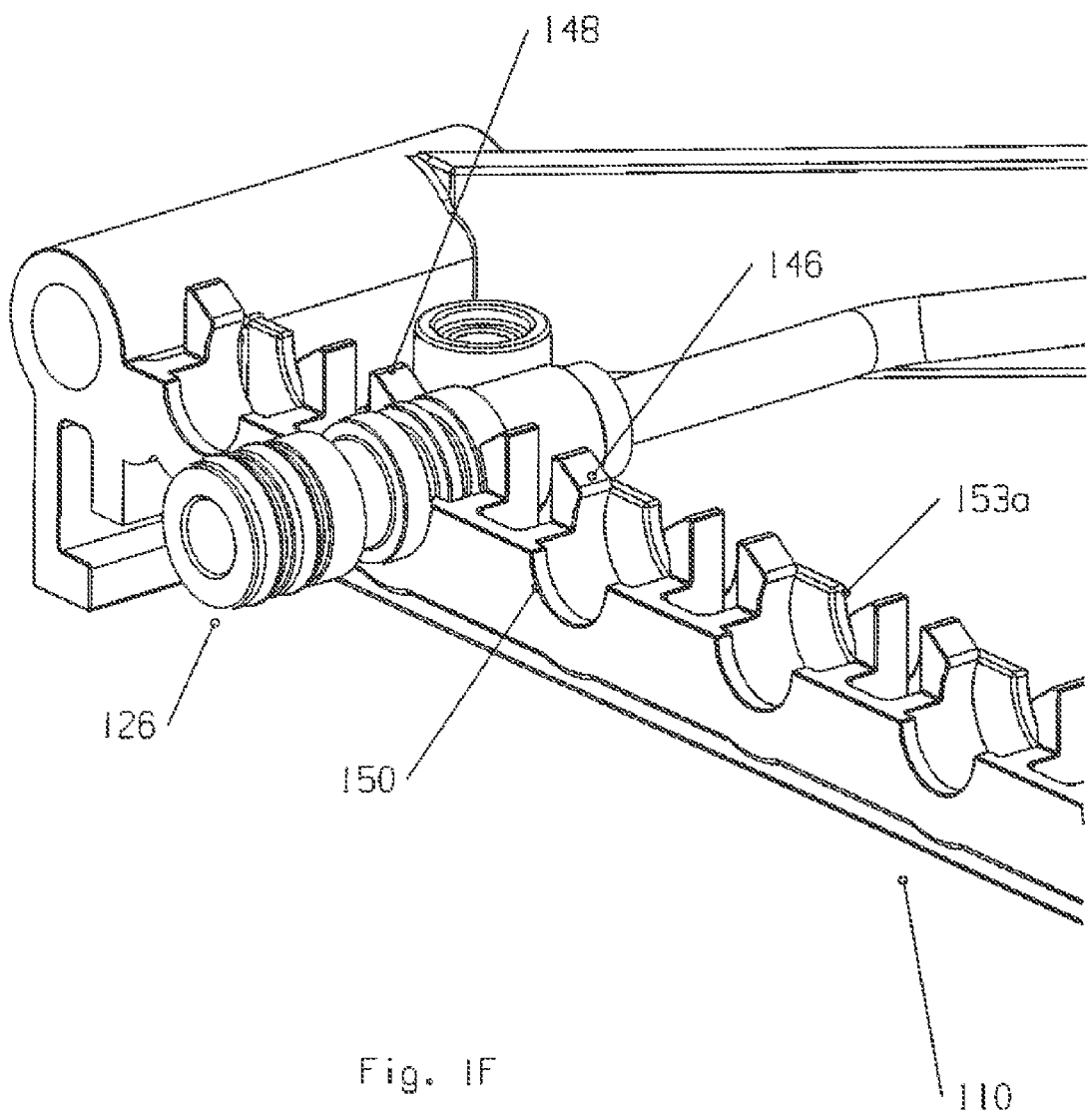
FIG. 1F is a detailed cutaway view in perspective illustrating the manner in which the connector fitting engages the housing.
Figure 2B:
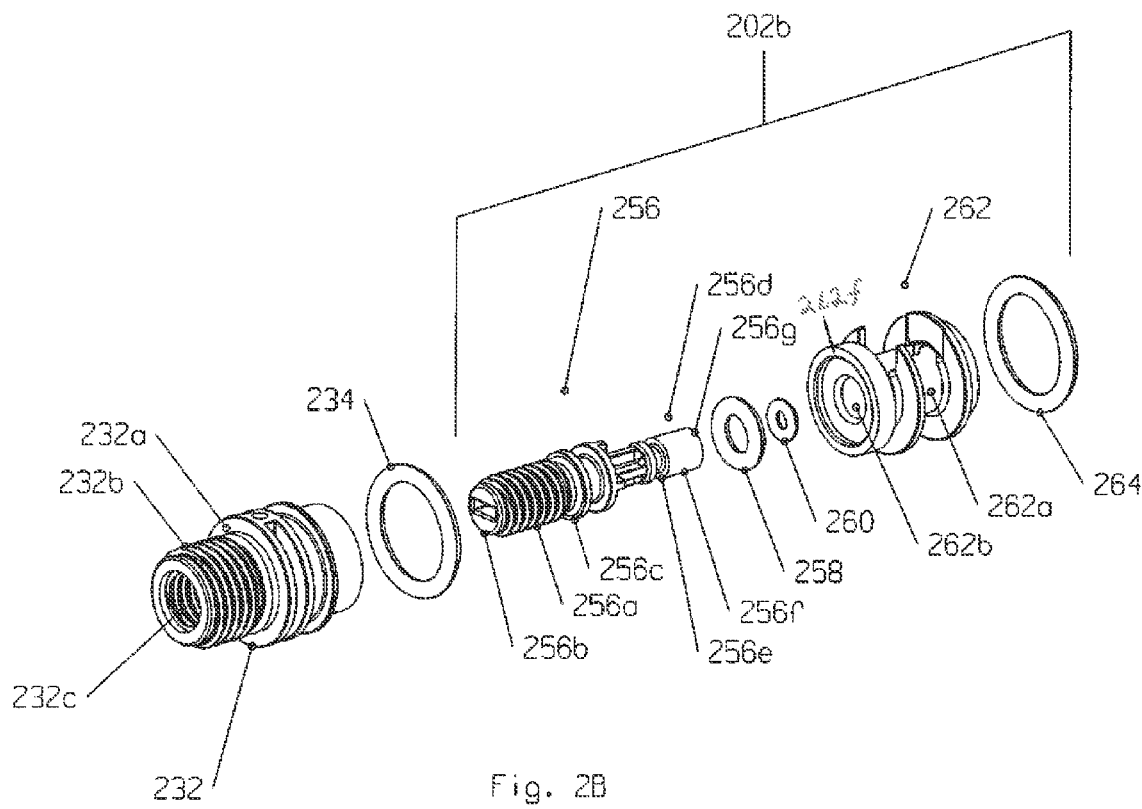
FIGS. 2B, 2C and 2D illustrate the fixed orifice adjustable flow control assembly, exploded in perspective view, a side elevational view and a side elevational view cross-section respectively.
Figure 2C:
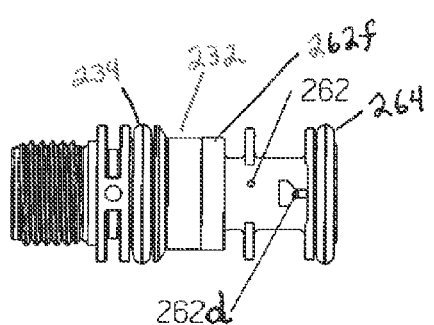
Figure 2D:
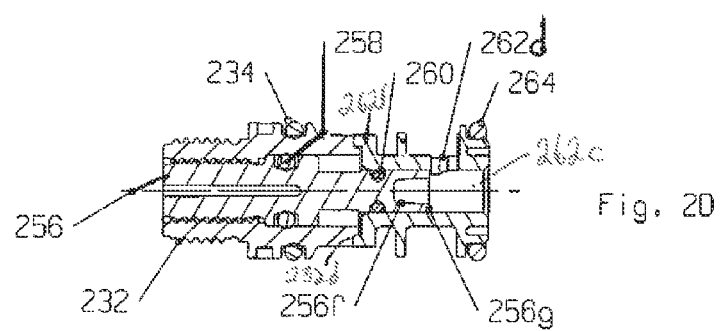
Figure 3A:
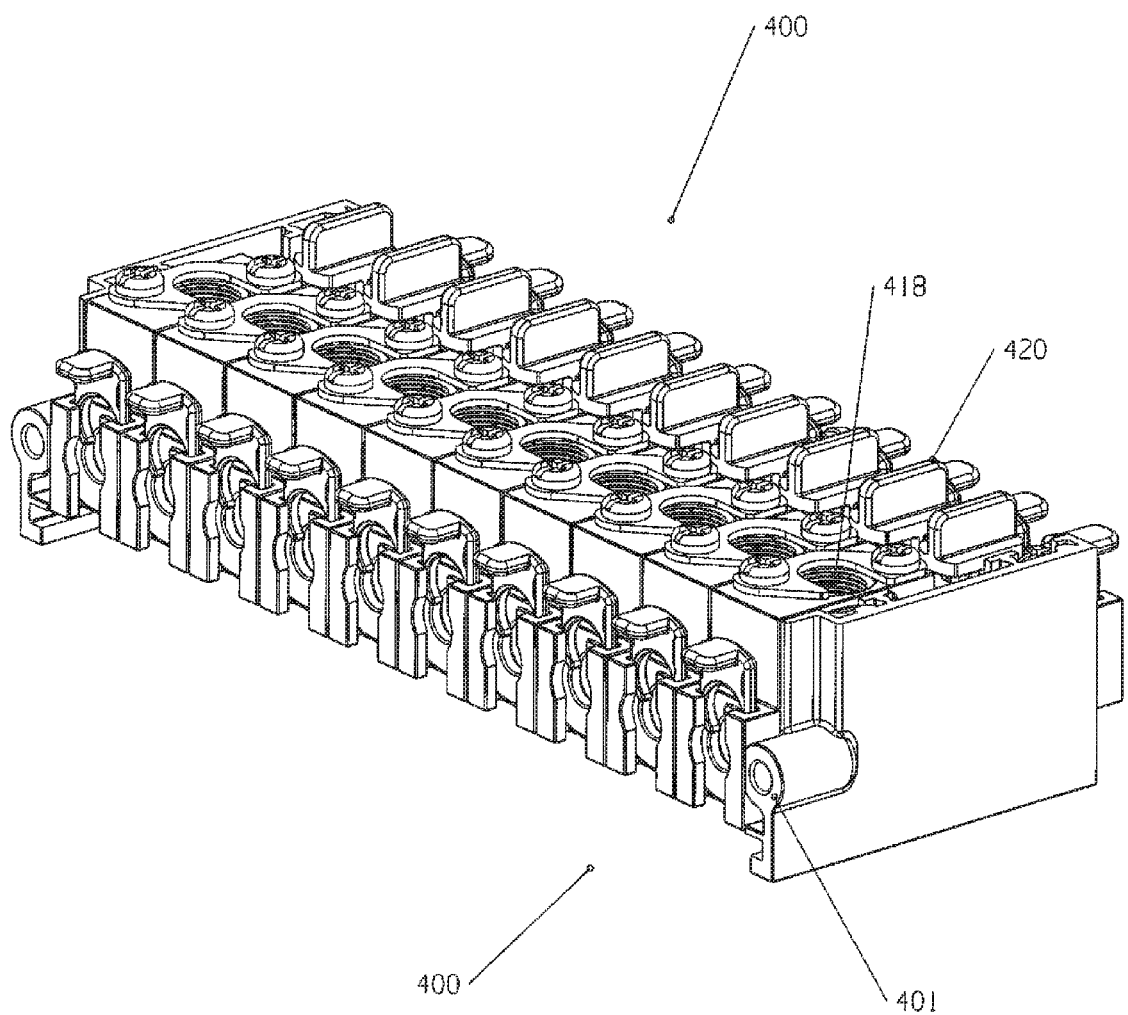
FIG. 3A is a perspective view of the mechanical flow control assembly.

FIGS. 1-1F illustrate a manifold assembly 100 that is engageable with either of the adjuster aligned flow control assembly 200 (seen in FIGS. 2, 2A, and 2C) or the mechanical flow control assembly 400 (see in FIGS. 3 and 3A). Moreover, it is seen, especially with reference to FIGS. 1 and 1A, that one of the functions of manifold assembly 100 is to arrange a multiplicity of tubes 108 from a linear arrangement as seen at an inlet end in FIG. 1A to circular arrangement for receipt into a sheath/tube assembly 102 seen in FIG. 1.

Sheath/tube assembly 102 is typically comprised of a sheath cover 104, typically helically wound metal and flexible, at the end 104a of which is provided a flange 106. A multiplicity of tubes 108 with tube ends 108a are aligned and attached to connector fittings 126. Tubes are then arranged for receipt within sheath cover 104 through which they will carry their contents to a dispenser gun in ways known in the art.

Manifold assembly 100 is seen to include a housing 113 comprised of a first housing plate 110 and a second housing plate 112, the two plates engaged through the use of a screws 114 through screw holes 116 in one of the plates and into screw bosses 118 in the other of the plates, the two plates drawing together form the manifold housing or housing 113. A wall 110a of one of the two plates, here plate 110, is typically flat for mounting adjacent a housing slide mounting plate 120. A tabular plate, such as housing slide mounting plate 120, is provided with a multiplicity of mounting plate screw holes 121 to mount the mounting plate to a support surface, typically the underside of a bar (not shown), which mounting plate 120 is adapted to slideably receive flat wall 110a of housing 113 without the use of tools in a manner and by means set forth more specifically below.

Housing 113 may have a connector face 122 in a connector end 124 for connecting to either of the adjuster aligned flow control assembly 200 or the mechanical flow control assembly 400 as set forth below. That is to say, the manifold assembly 100 is common to either assemblies 200/400.

Connector fittings 126, typically cylindrical, are adapted to receive tube ends 108a through the use of a ferrule 128. A ferrule 128 is slipped over tube end 108a and nose 130 of connector fitting 126 is wedged on in ways known in the art. Connector fitting 126 is typically provided with an engagement land 132, an alignment slot 134, a coupler lock slot 136, and O-rings 142 for engagement with a pair of O-ring slots 140 on the fitting. These fittings 126 will be aligned as seen in FIG. 1A (three are removed to show structure of the housing 113). The fittings 126 will "plug into" and lock to female port structures in assembles 200 or 400.

Turning now to first housing plate 110, it is seen to have a multiplicity of resilient paired retainers 144 comprising a first retainer leg 146 and a second retainer leg 148, the retainer legs defining a cup-shape interior and being shaped resilient for engaging the engagement land 132 of connector fitting 126, so as to lockingly and releasably maintain the connector fitting in the alignment illustrated in FIGS. 1A and 1F (several fittings shown). A semi-circular locating lip 150 on first housing plate 110 cooperates with a similarly dimensioned semi-circular cooperating locking lip 152 on housing plate 112 in a manner seen in FIGS. 1A, 1D, and 1F. These engage coupler lock slot 136 of the connector fitting when first and second housing plates 110 and 112 are joined together. This prevents the longitudinal movement of the connector filling with respect to housing 113 and to securely align a multiplicity of connector fittings 126 for receipt with either of the adjuster aligned flow control assembly 200 or a mechanical flow control assembly 400 as further set forth below. Also noted are paired cups 153a/b on housing plates 110/112 to snugly engage ferrule 128.

Applicants provide a novel manner in which housing 113 lockingly engages slide mounting plate 120. More specifically, Applicants provide an elongated engagement pin 156 with a removed end 157 for engagement with an engagement pin slot 158 in second housing plate 112. First housing plate 110 is provided with an engagement pin slot channel 160 which aligns with and will engage the engagement pin slot 158 when the two housing plates 110 and 112 are joined together in a manner which will allow pin 156 to be held slideably in slot/channel 158/160 with removed end 157 protruding from housing plate 112. A retainer clip 159 will engage a retainer spring 161, which is dimensioned for receipt onto the shaft of engagement pin 156, and for engagement with housing 113, so as to urge pin removed end 157 out of the housing so that it may be frictionally engaged with a snugly dimensioned angled or shaped pin receipt channel 162 in mounting plate 120 ending in pin recess 163 of the mounting plate, dimensioned to receive removed end 157. This will prevent inadvertent sliding of housing 113 with respect to plate 120 and user need only grasp and pull head 155 of engagement pin 156 to withdraw the removed end 157 from channel 162 and allow housing 113 to slide off plate 120 in a manner set forth below.

Securement of housing 113 to mounting plate 120 may be further enhanced by the use of one or more, typically a pair, of securement screws 185 with retainer clips 159 and retainer springs 161. However, clips 159/springs 161 on screws 185 will urge removed ends 185a so they do not normally protrude from the outer surface of housing plate 110. When pin 156 is engaged into pin recess 163, removed ends 185a will be threaded receiving portions 187 (typically threaded inserts) of mounting plate 120, for threaded engagement therewith.

Housing 113 is slideably and toollessly engaged to mounting plate 120 through the use of joinder assembly 164. Joinder assembly 164 is comprised of a pair of shoulders 166 on the mounting plate designed and dimensioned to cooperate with a pair of slots 168 along the outer edges of housing plate 110 in a manner illustrated in FIGS. 1 and 1A.

Lips 180 and cup shaped members 182 at the sheath receiving end 104a of housing 113 cooperate with end 104a of sheath cover 104 and flange 106. Second housing plate 112 has similarly dimensioned and located elements 180/182 and, when plates 110/112 are joined with flange 106 in lips 180, sheath end 104 may be held snugly in place with a multiplicity of tubes 108 being directed from the linear arrangement at connector face 122 of the sheath.

It is seen with reference to FIGS. 1 and 1A that alignment/release screws 170/170a (two embodiments illustrated) may be provided on both sides of housing 113 for receipt into threaded portions 178. Applicants' alignment/release screws incorporate an alignment pin 172 at a removed end thereof, a threaded section 174, a slotted head 176 or blade head (see embodiment 170a), and a shoulder 171 between alignment pin 172 and threaded section 174. Typically, when either of the adjuster aligned flow control assembly 200 or the mechanical flow control assembly 400 is ready to be mated to manifold assembly 100, the two screws will be threadably adjusted so that face 179 (see FIG. 1A) is adjacent shoulder 171. Face 201 of the adjuster aligned flow control assembly 200 or face 401 of mechanical flow control assembly (see FIGS. 2 and 3, respectively) will be spaced slightly apart, from face 179 but alignment pin 179 will be in either of opening 203/403. It will be noted that face 201 and face 401 both have openings 203/403 for snug, slideable receipt of pin 172 therein during the joinder process of manifold housing 113 to either of assemblies 200/400. The faces are in flush relationship when the housing 113 with the multiple connector fittings 126 are fully inserted into the multiple outlet ports 224 (if assembly 200 is connected) or the multiple outlet ports 434 (if assembly 400 is used). The alignment pins of assembly 100 will engage the openings of either assembly 200 or 400 before the connector fittings reach the ports 224/434.

This will allow clean, aligned engagement. For disengagement, alignment screws 170 may be rotated alternately and shoulder 171, being larger than either of holes 203 or 403, would urge the flow control assembly away from housing 113 to uncouple (release) them. That is to say, to uncouple housing 113 from joinder with either of the flow control assemblies when they are properly coupled together (connector fittings 126 flush into outlet ports 224/434), one would alternately advance the screws, first one and then the other, so as to urge separation of the manifold assembly 100 from the flow control assembly 200 or 400. The alignment pins help maintain engagement of the housing of either of the adjuster aligned flow control assembly 200 or mechanical flow control assembly 400, while housing 113 and the connectors are separated.

FIG. 1 also illustrates an alternate preferred embodiment of alignment screws 170a. These screws provide, instead of a slotted head 176, a blade head 176a, that may be easily grasped between the thumb and forefinger to rotate the same. This allows hand engagement and disengagement. Indeed, in an alternate preferred embodiment, even alignment screws 170 may be easily manipulated by hand, especially when the slotted head is of sufficient diameter and thickness to be easily grasped as, for example, by diameter of about ¼ inch or larger and a thickness of about ⅜ inch or larger. It is noted that such toolless alignment and disassembly will facilitate the separation and removal of the manifold assembly from either of the flow control assemblies in a manner where the entire operation is toolless. That is to say, it may be appreciated with reference to the specification and drawings that coupling and uncoupling of the flow control assembly from the manifold and the flow control assembly from the lines upstream thereof (see FIG. 2E) and the separation of the elements from the mounting plate may all be achieved without the use of tools.

First, as set forth above, manual rotation of the alignment/release screws is achieved through proper dimensioning of the screw and screw head. Second, as set forth in the specification herein, slot 168/210/410 provides for coupling to the mounting plate (see FIG. 1 for slot 168, see FIG. 2 for slot 210 and FIG. 3 for slot 410). Likewise, upstream of the flow control assembly, there is slideable, plug in coupling of connectors on the fluid lines to the flow control assembly as set forth in FIG. 2. Retainer clips or slides and retainer slide slots on both upstream and downstream ends of the flow control assemblies provide for fluid tight coupling to connectors on the manifold assembly and connectors on the high pressure fluid lines—without the use of tools. Finally, slots 168/210/410 achieve lateral toolless engagement with the mounting plate. Moreover, each of the flow control assemblies have a shutoff valves 206/406 that are hand (toollessly operated). Thus, disassembly may be achieved by rotating the handle manipulated handle portion and related structures to shut off fluid coming into the flow control assembly as fluid upstream in fluid lines supplying the flow control assembly may be shut off. Uncoupling the retainer slides 460 holding the high pressure fitting 432 may be achieved by hand and uncoupling the entire unit from the mounting plate may be achieved by hand disengagement of elongated engagement pin 156 and securement screws, if used, and sliding the unit off the mounting plate. Then unlocking the connector fittings 126 from the outlet ports of the flow control assembly, uncoupling either retainer slides 228 (FIG. 2) or 458 (FIG. 3), will allow operation of release means.

FIGS. 1 and 1B also illustrate the use of a label assembly comprising labels 189/190/191 for placement somewhere on one or more of the assemblies, here on housing 113 of manifold assembly. Labels contain at least some common symbols and/or words. Label 191 places the symbols/words adjacent port location to indicate the fluid therein. Label 189 keys the port location to a handle end location of a bar gun (not shown) and label 190 to a button location on a bar gun. For example, "S2" at 192a designates a fluid flowing through the port adjacent thereto. "S2" at 192b designates the location for the fluid line attached to the port at 192a (which fluid line may also carry the indicia "S2") to engage the rear of the bar gun handle. Finally "S2" at 192c illustrates to the user or a maintenance person, the fluid coming out of the bar gun when the upper right-side button is pushed is the fluid from port "S2" at 192a and in the fluid line designated "S2." Since soda and water are common to most bar guns, those words may be used in place of symbols. Even if words (Coke, root beer, etc.) were used in place of symbols, the labels would be helpful to identify ports/lines, buttons, keyed by the location of the manifold ports and the pattern of the handle ports and buttons. Note that label assembly 189/190/191 may include flavor label 242 indicating the nature of the fluid that the adjuster screw 244/256 will act upon.

FIGS. 2, 2A, and 2E illustrate the adjuster aligned flow control assembly 200 comprising a multiplicity of adjuster aligned flow control modules 202 nested in a staggered arrangement as seen in FIGS. 2A and 2E. A housing 204, and a multiplicity of separate ball valve assemblies 206 are engaged with each of a multiplicity of adjuster aligned flow control modules 202, the ball valve assemblies 206 upstream thereof and toollessly coupled, as by slide fitting therewith.

More specifically and with reference to FIGS. 2, 2A, and 2E, it is seen that Applicants provide a multiplicity of adjuster aligned flow control modules (or simply flow control modules) 202 positioned as illustrated with respect to housing 204, such that fluid flow illustrated by the arrow in FIG. 2 is aligned with a longitudinal axis of body 218 of the flow control module 202 in a general parallel relationship. That is to say, the longitudinal axis of body 218 of flow control module 202 is seen to be generally parallel to and aligned with the flow of the fluid as it comes in and is seen to be parallel to the flow, but spaced apart as it leaves the adjuster aligned flow control assembly 200. Further either of a flow adjuster screw (fixed orifice) 256 or a flow adjuster screw (self-adjusting) 244 will have an axis that lies generally parallel to the fluid flow through the assembly, the fluid flow defined by the orientation of the inlet couplings from the fluid tanks and the outlet couplings to the manifold assembly.

Applicants' novel adjuster aligned flow control assembly 200 provides for either of a self-adjusting module subassembly 202a to be used or a fixed orifice manual adjustable flow control assembly subassembly 202b to be used therewith, both typically dimensioned for engaging the same body 218 and both for providing the flow adjuster screws 244/256 that are aligned such that they are parallel with incoming and outgoing fluid flow and typically in a horizontal plane when the unit is attached to a support surface. This alignment provides easier adjustment especially when the assembly is mounted in a position such that the incoming and outgoing water flow of the assembly is in a horizontal plane.

As can be seen in FIGS. 2, 2A, and 2E adjuster aligned flow control assembly 200 includes a housing 204 dimensioned to receive thereon a multiplicity of flow control modules 202 and a multiplicity of separate ball valve assemblies 206. Housing 204 locates a flow control module 202 adjacent a ball valve assembly 206 as set forth below.

Turning now to housing 204, it is seen to comprise a housing base 208 which may be slideably engaged to mounting plate 120 in the same manner as mounting plate 120 receives housing 113. Housing 204 includes face 201 an opening 203, and slot 210. Slot 210 engages shoulders 166 in mounting plate 120. Face 201 and opening 203 cooperate with alignment screws 170 to align and couple the flow control assembly 200 to housing 113 and mounting plate 120.

Housing base 208 also includes a multiplicity of mounting screw holes 214 with a multiplicity of mounting screws 215 dimensioned for receipt therethrough, which mounting screws will couple with mounting bosses 230 of body 218 to maintain flow control modules 202 fixed onto housing 204. Moreover, housing 204 may provide coupling cutouts 216 designed to receive neck 220 of body 218 in a manner that aligns body 218 with ball valve assembly 206. Moreover, separate ball valve assembly 206 is upstream of flow control module 202 and the base is dimensioned such that removal of two screws from mounting bosses will allow the "unplugging" of outlet 270 from neck 220 for servicing or removal of module 202. The ball valve assembly should be in a "shut off" position when they are uncoupled and need not be unscrewed from the housing.

Flow control module 202 includes a number of elements common to both self-adjusting or fixed orifice subassemblies 202a/202b. That is to say, flow control module 202 may include either of subassembly 202a (self-adjusting) or subassembly 202b (fixed orifice), both subassemblies compatible with the common parts of flow control module 202 as set forth below.

Flow control module 202 may include either of body support 221 or body support 223, the difference which may be appreciated with reference to FIGS. 2, 2A, and 2E. Body support 221 maintains cylindrical bore 219 a first distance above the housing base 208 and body support 223 maintains cylindrical bore 219 spaced higher, vertically from the housing base 208. This difference provides the alternating nesting or staggered arrangement of alternating modules as seen placed in FIG. 2A. Moreover, although the modules are staggered, as a result of the height of body support 223 as compared to body support 221, it is seen that the placement of neck 220 is near the top of cylindrical bore 219 for the shorter body support and is near the bottom of cylindrical bore 219 when the taller body support 223 is provided. As a result, a linear (unstaggered) arrangement of shutoff valve assemblies 206 may be provided despite the staggered arrangement of the multiple flow control modules 202.

Flow control module 202 includes a body 218. Body 218 supports a cylindrical bore 219, having an open end for receiving the flow control elements (subassemblies) as set forth below and an end in fluid communication with the neck 220. Neck 220 defines an inlet to receive fluid into cylindrical bore 219. Cylindrical bore 219 is in fluid communication with a vertical channel 222, which vertical channel is in fluid communication with a horizontal channel 225, which terminates at an outlet port 224 dimensioned to receive connector fitting 126. Channels 222/225 are in the interior of body 218 downstream of bore 219 to direct the flow of fluid therethrough.

Retainer slides 228/292/458/460 are captured in retainer slots 226/290 for engagement and disengagement with connector fittings 126/432 coupling to the flow control manifold 200/400. Chips or slides 228/292/458/460 (of slides/slot combination) are "captured" in the slots 226/290, so the slides cannot fall out. The slides have a large interior opening adjacent a smaller interior opening. A large tab 292a protrudes outward and a smaller tab 292b protrudes inward from the removed ends of the slides. The larger tab is easily grasped and the smaller tab limits the downward travel of the slide in the slot. The width of the tabs is less than the dimension across the inner wall faces of the slots.

An indent 292c (see FIG. 3) on the slides underside will receive a similarly shaped, but protruding stop 292d (see FIG. 3) on the wall just above the port. The protruding stop will prevent the slide from falling out when there is no male fitting engaged therewith. Note that sliding the large opening so it is adjacent the port will allow the male fitting (432 or 126) to pass through the clip and slide into the port. Then the clip can be pushed up and the smaller opening will snap onto the lock grooves in the male fittings to prevent longitudinal movement of the fitting. When the male connectors are locked in, and the assemblies 100/200 or 100/400 are engaged and on the mounting plate, trying to uncouple the clip/fitting will be prevented by the mounting plate. That is to say, when clips or slides 228/292/458/460 are locked to their male fittings and the assemblies are on the mounting plates, the removed end of the clip (on small tab 292b end of retainer) is flush or close to flush with the bottom of housings 204/404 and directly adjacent the mounting plate. Ridges 292e (see FIG. 3) will help keep the retainer snug in the slot and help ensure a snug fit between indent 292c and stop 292d.

Dimensioned for slideable receipt into bore 219 (as more fully set forth below) is an adjustable screw housing 232 with grooves for housing an O-ring 234 for fluid tight seal against bore 219. Retainer plate 236 is dimensioned to engage a shoulder 232a of adjustment screw housing 232 while allowing a threaded neck 232b to pass through retainer plate 236. Retainer plate screws 238 will urge retainer plate 236 against adjustable screw housing 232 and toward body 218 while snuggly seated in screw holes 229. A dust cover 240 is dimensioned for threadably receipt onto neck 232b (which is threaded), as well as a removable flavor label 242 to indicate to the user the nature of the fluid flowing through the module.

The flow control module 202 may have either a fixed orifice flow control subassembly 202a or an self-adjusting flow control assembly 202b for insertion into cylindrical bore 219. Both subassemblies will control the flow of fluid through the body 218.

Self-adjusting flow control subassembly 202a may be manually set with a flow adjuster screw 244 and will be responsive to upstream fluid pressure changes while maintaining substantially the same rate of flow downstream thereof, in ways known in the art.

Fixed orifice flow control subassembly 202b will manually set a flow and, when the upstream fluid pressure changes, the fixed orifice remains unchanged. That is to say, fluid pressures upstream of the self-adjusting flow control subassembly 202a will cause the subassembly to adjust the orifice size responsive thereto (drop in pressure providing a larger orifice).

A self-adjusting subassembly is known in the art and is comprised of a flow adjuster screw 244, an O-ring 246, a spring 248, a piston 250, and a sleeve 252 having an O-ring 254 mounted thereon for slideable and snug receipt into cylindrical bore 219 of body 218. The subassembly is held in place by adjuster screw housing 232.

Fixed orifice subassembly 202b is described in more detail herein. Both subassemblies have longitudinal axes which are aligned with the longitudinal axis of cylindrical bore 219, which is aligned generally with the intake and outlet ports in a horizontal fashion so as to allow easy adjustment with the horizontally held instrument, such as a screwdriver. The screwdriver will engage a slotted head of either flow adjuster screw 244 or flow adjuster screw 256.

Turning now to FIGS. 2B, 2C, and 2D, detailed views of the flow control subassembly 202b may be appreciated. A flow adjuster screw 256 of subassembly 202b is threadable coupled to adjuster screw housing 232 (common to both flow control subassemblies 202a and 202b), which housing 232 includes a threaded internal bore 232c. More specifically, flow adjuster screw 256 is seen to have a threaded section 256a for threadable receipt into threaded bore 232c as seen in FIG. 2C. Moreover, flow adjuster screw 256 is seen to have slotted head 256b for receipt of a screwdriver therein during the adjustment process whereby flow control is manually set as set forth in more detail below. O-ring grooves 256c and 256e are provided for receipt of O-rings 258 and 260 therein and a neck 256d is provided, which neck includes a nose 256f upstream of O-ring groove 256e, which nose 256f includes a removed edge 256g.

Orifice housing 262 engages and cooperates with adjusting screw housing 232 and flow adjustment screw 256 in a manner and with the structure of which are more specifically set forth below. Orifice housing 262 is structured to provide cylindrical portion 262a, the inner walls of which define a bore 262b for snug receipt of nose 256f of flow adjuster screw 256 with O-ring 260 providing an effective fluid seal when nose 256f is slideably received within bore 262b. One end of orifice housing 262 defines an inlet 262c for receiving fluid from neck 220 of body 218. An orifice 262d, typically key shaped, is provided as best seen in FIGS. 2C (cross-section) and 2D (top view). An annular O-ring groove 262b is provided for receipt of O-ring 264 therein. Annular shoulder 262f is provided at the end opposite inlet 262c, which annular shoulder 262f is designed to seat around annular groove 232d of adjustable screw housing 232 in a manner best seen in FIG. 2C. As seen in FIG. 2C, O-ring 234 provides a seal between adjustable screw housing 232 and cylindrical bore 219 and O-ring 264 provides a fluid tight seal between orifice housing 262 and cylindrical bore 219. Likewise, O-ring 260 provides a fluid seal between nose 256f and cylindrical bore 262c. O-ring 258 provides a fluid seal between adjuster screw housing 232 and flow adjuster screw 256.

When adjuster screw 256 is threaded into adjuster screw housing 232, and the unit is seated against orifice housing 262, the unit comprising elements 256/232/262 (along with the O-rings), will slide into the bore of body 218 with retainer plate 236 holding elements 232 (urged against shoulder 232a) and 262 tightly together against the face of removed end of cylindrical bore 219. By threadably adjusting flow adjuster screw 256, edge 256g may be selectively set to occlude or block portions of orifice 262d and therefore selectively control the flow of water through module 202B.

Turning now to ball valve assembly 206, the details may be appreciated with respect to FIG. 2. Ball valve assembly 206 includes body 266, body 266 defining an inlet port 268 and outlet 270, wherein the inlet and outlet are typically aligned with one another and the opening in the ball valve in a straight line.

Screw mounting boss 272 provides for receipt of mounting screws 215 through mounting screw holes 214 to hold the ball valve assembly 206 snugly against housing 204 when outlet 270 is engaged in a fluid sealing manner with neck 220 of flow control module 202. A bore 274 receives a ball valve 276 dimensioned for receipt into the same, which ball valve 276 includes a handle portion 278 and a ball portion 280, the ball portion having a channel 282 therethrough. Washer 283 supplies a snug fit for the ball and O-ring 284 seals fluid for flow within body 266. A slotted retainer plate 286 is dimensioned to be received below the handle in a slot 277 between the handle and the ball and is held to the body 266 by retainer screws 288. Slotted retainer plate 286 will maintain the ball valve 276 longitudinally within the body. Retainer slides 292 and retainer slots 290 are provided to couple with connectors in a manner described above, for example, with respect to elements 226/228.

Turning now to FIGS. 3 and 3A, it is seen how a mechanical flow control assembly 400 may be provided with structure for at least the following functions. First, slideable receipt onto mounting plate 120, such that mounting plate 120 will provide vertical support to both the manifold assembly 100 and the mechanical flow control assembly 400. Second, alignment screws 170 will help alignment and receipt of the flow control assembly 400 onto the manifold assembly 100. Further, mechanical flow control assembly 400 is dimensioned to be received on the same mounting plate and engage the same manifold assembly 100 as the adjuster aligned flow control assembly 200. A single mounting plate is commonly designed so as to mount the manifold in either configuration (mechanical flow or adjuster aligned). The manifold is also common to either of the two assemblies, for accepting either.

Mechanical flow control portion 402 is provided with flow control adjuster means that are perpendicular to an inlet flow and an outflow, and thus differ from aligned flow control assembly 200, which provides alignment between inlet and outlet of the flow control assembly and the flow control adjustment means.

Mechanical flow control assembly 400 includes a mechanical flow control portion 402, housing 404, and a ball valve assembly 406 which is typically integral with the mechanical flow control portion 402. The mechanical flow control portion 402 provides structure that allows one to control the flow of a fluid downstream thereof. The ball valve assembly 406 allows one to shut off liquid flow before it gets to the mechanical flow control portion 402. A body 422 provides for the receipt of fluid from pressurized fluid lines, structure for defining channels therethrough, and location of the ball valve assembly 406 upstream of portion 402.

Housing 404 is configured to accept body 422 thereupon and to engage the manifold and engage the mounting plate. It includes a face 401, the face 401 having a pin opening 403 for receipt of alignment pin 172 there into. A pair of slots 410 are dimensioned laterally and spaced apart the same distances as slot 168 to engaged shoulders 166 of mounting plate 120. The base of housing 404 also includes a multiplicity of mounting screw holes 414 for receipt of mounting screws 416 therethrough, which mounting screws are designed to hold body 422 against base 408 of housing 404. In addition, base 408 may include boss receiving holes 415 dimensioned for receiving mounting boss 426 of body 422.

Turning to flow control/ball valve assembly 402/406, it is seen that a flow control adjuster screw 418 is provided for adjusting the flow of a fluid between an inlet and an outlet thereof. A ball valve 420 is provided for mounting in the body 422. Mounting screw receiving holes 424 are provided in the body for receiving mounting screws 416. Mounting boss 426 is provided for receipt into the body at boss receiving holes 415. A bore 428 is provided for ball valve 420 and at threaded cavity 430 for receipt of adjusted screw 418 therein.

Retainer plates 462 are provided, dimensioned with a cutout 462a therein. Cutouts allow a slide fit of plate 462 beneath the handle of the ball valve (see FIG. 3A) for added safety. Further, the dimension across cutout 462a is smaller than the diameter of flow control adjusting screw 418 (but sufficient for a screwdriver to pass through), so the flow control adjusting screw 418 cannot blow out under pressure when the retainer plate is screwed down.

Adjuster screw 418 and the manner of its construction and use are known in the art. It will allow an adjusted flow between fluid inlet 433 and controlled flow fluid outlet 434. Fluid inlet 433 is configured to slideably receive fluid tight fitting 432 to hold the same snug onto body 422. Further, slideable releasable locking structure is provided, same as retainer slide slots 226 and retainer slide 228 (see FIG. 2) at both controlled flow fluid outlet 434 (engaging fitting from the manifold assembly) and high pressure fluid inlet 433 (engaging fittings from the pressurized fluid lines).

The term fluid flow channel assembly may be used to described the shutoff vale and either the flow control module (on adjuster aligned flow control assembly) or the mechanical flow control portion (on the mechanical flow control assembly). The fluid flow channel assembly on the adjuster aligned flow control assembly is separable, wherein the shutoff valve may stay attached to the housing while the flow control module, downstream thereof, is removable for service, repair or replacement.

Although the invention has been described with reference to specific embodiments, this description is not meant to be construed in a limited sense. Any particular reference to a container shape or a securing mechanism is for illustrative purposes only and is intended to encompass alternate shapes and mechanisms. Various modifications of the disclosed embodiments, as well as alternative embodiments of the inventions will become apparent to persons skilled in the art upon the reference to the description of the invention. It is, therefore, contemplated that the disclosure will cover such modifications that fall within the scope of the invention.

The invention claimed is:

1. A device for the controlled delivery of pressurized fluids from a multiple of pressure fluid sources having a multiple of pressure fluid lines engaged therewith, to a bar gun, the device comprising:

a flow control assembly including a housing, the flow control assembly with a multiple of fluid flow channel assemblies, each fluid flow channel assembly comprising a high pressure fitting receiving port thereon adapted to receive a fluid pressure line from a fluid source, an on/off valve downstream of the high pressure fitting receiving port, the on/off valve having an inlet port and an outlet port, and a separate flow control module downstream of the on/off valve, the flow control module having a body, an inlet port and an outlet port, wherein the flow control module is releasably coupled to the on/off valve, the flow control assembly including the housing for receiving the multiple of fluid flow channel assemblies thereon, such that high pressure fitting receiving ports are aligned adjacent one another in a substantially straight line and whereby the on/off valves are adjacent one another in a substantially straight line and whereby the outlet ports of the flow control modules are in a substantially straight line;

a manifold assembly including a housing and a multiplicity of connector fittings, each connector fitting having an upstream end adapted to releasably engage the outlet port of the flow control channel assemblies, the multiple of connector fittings including a downstream end adapted to receive a bar gun tube, each connector fitting having a body between the upstream end and the downstream end, the body adapted to engage the housing of the manifold assembly such that the connector fittings are aligned with the outlet ports of the flow control modules of the flow control assembly; and a sheath tube assembly for engaging the manifold assembly, the sheath tube assembly including a multiplicity of the bar gun tubes and a sheath for substantially enclosing the multiplicity bar gun tubes.

2. The device of claim 1, wherein the on/off valve is toollessly coupled to the flow control module.

3. The device of claim 1, wherein a flow control module includes either a fixed orifice subassembly or a self-adjusting subassembly and wherein the body of the flow control module is dimensioned to substantially enclose, at different points in time, either subassembly.

4. The device of claim 3, wherein both the fixed orifice subassembly and the self-adjusting subassembly include walls adapted to engage an adjusting tool such that the adjusting tool engages the walls parallel to the outlet ports of the flow control assembly.

5. The device of claim 4, wherein both subassemblies include a flow adjusting screw having a head portion, the head portion having walls for engaging the adjusting tool, the walls for engaging of the fixed orifice subassembly being substantially identical to the walls for engaging the self-adjusting subassembly.

6. The device of claim 1, wherein the multiplicity of high pressure tube receiving ports have longitudinal axes, the multiplicity of flow control modules have longitudinal axes and the outlet ports have longitudinal axes, wherein all the longitudinal axes are substantially parallel.

7. The device of claim 1, wherein the flow control module includes either a fixed orifice subassembly or a self-adjusting subassembly and wherein the body is dimensioned to enclose, at different points in time, either subassembly; wherein both the fixed orifice subassembly or the self-adjusting subassembly include walls adapted to engage an adjusting tool such that the adjusting tool engages the walls parallel to the outlet ports of the flow control assembly; and wherein both subassemblies include a flow adjusting screw having a head portion, the head portion having walls for engaging the adjusting tool, the walls for engaging of the fixed orifice subassembly being substantially identical to the walls for engaging of the self-adjusting subassembly.

8. The device of claim 1, wherein the flow control module includes a mechanical flow control portion.

9. The device of claim 8, wherein the mechanical flow control portion includes a retainer plate.

10. The device of claim 1, wherein the flow control module includes one of a mechanical flow control portion, a fixed orifice subassembly, or a self-adjusting subassembly, such that the arrangement and spacing of the outlet ports is the same, regardless of the chosen flow control module.

11. The device of claim 1, further including a mounting plate for slideably receiving the flow control assembly and the manifold assembly thereon.

12. The device of claim 1, wherein the flow control module includes one of a mechanical flow control portion, a fixed orifice subassembly, or a self-adjusting subassembly, such that the arrangement and spacing of the outlet ports is the same, regardless of the chosen flow control module; and further including a mounting plate for slideably receiving the flow control assembly and the manifold assembly thereon.

13. The device of claim 1, wherein the flow control module includes either a fixed orifice or self-adjusting subassembly and wherein the body is dimensioned to enclose, at different points in time, either subassembly; and further including a mounting plate for slideably receiving the flow control assembly and the manifold assembly thereon.

14. The device of claim 1, wherein the flow control module includes either a fixed orifice subassembly or a self-adjusting subassembly and wherein the body is dimensioned to substantially enclose, at different points in time, either subassembly; wherein both the fixed orifice or the self-adjusting subassemblies include walls adapted to engage an adjusting tool such that the adjusting tool engages the walls parallel to the outlet ports of the flow control assembly; wherein the flow control module includes one of a mechanical flow control portion, a fixed orifice subassembly, or a self-adjusting subassembly, such that the arrangement and spacing of the outlet ports is the same, regardless of the chosen flow control module; and further including a mounting plate for slideably receiving the flow control assembly and the manifold assembly thereon.

15. The device of claim 1, including means for toollessly engaging the manifold assembly to the flow control assembly, clips for toollessly and releasably locking the connector fittings of the manifold assembly to the flow control assembly; clips to toollessly and releasably lock high pressure tube fittings to the flow control assembly, and release means function toollessly, further including a mounting plate for toollessly mounting and securing of the manifold assembly and flow control assembly thereto.

16. The device of claim 15, wherein the on/off valve is toollessly coupled to the flow control module.

17. The device of claim 16, wherein the flow control module includes either a fixed orifice subassembly or a self-adjusting subassembly and wherein the body is dimensioned to enclose, at different points in time, either subassembly.

18. The device of claim 17, wherein both the fixed orifice subassembly and the self-adjusting subassembly include walls adapted to engage an adjusting tool such that the adjusting tool engages the walls parallel to the outlet ports of the flow control assembly.

19. The device of claim 15, wherein both subassemblies include a flow adjusting screw having a head portion, the head portion having walls for engaging an adjusting tool, the walls for engaging of the fixed orifice subassembly being substantially identical to the walls for engaging of the self-adjusting subassembly.

20. The device of claim 15, wherein the flow control module includes either a fixed orifice subassembly or a self-adjusting subassembly and wherein the body is dimensioned to enclose, at different points in time, either subassembly; wherein both the fixed orifice subassembly or a self-adjusting subassembly include walls adapted to engage an adjusting tool such that the adjusting tool is parallel to the outlet ports of the flow control assembly; and wherein both subassemblies include a flow adjusting screw having a head portion, the head portion having walls for engaging an adjusting tool, the walls for engaging of the fixed orifice subassembly being substantially identical to the walls for engaging of the self-adjusting subassembly.

21. The device of claim 1, wherein the housing of the fluid control assembly separately engages the flow control module and the on/off valve and wherein the flow control module slidably couples along a longitudinal axis so that the on/off valve may remain engaged with the housing while the flow control module is uncoupled therefrom.

22. The device of claim 1, further including a label assembly.

23. The device of claim 1, further including means for releasing the manifold assembly from the flow control assembly when the two are engaged.

24. The device of claim 23, wherein the release means includes threaded screws on the manifold assembly and interference walls on the flow control assembly.

25. The device of claim 24, wherein the threaded screws have a head adapted to be grasped and manipulated manually.

26. The device of claim 24, wherein the threaded screws include alignment pins to help align the connector fittings of the manifold assembly with the outlet ports of the flow control assembly.

27. The device of claim 26, wherein the release means includes threaded screws on the manifold assembly and interference walls on the flow control assembly, and wherein the threaded screws have a head adapted to be grasped and manipulated manually.

* * * * *